Aug. 8, 1933.                M. WALD                1,921,273
                        SIGNALING DEVICE
                       Filed Jan. 20, 1931
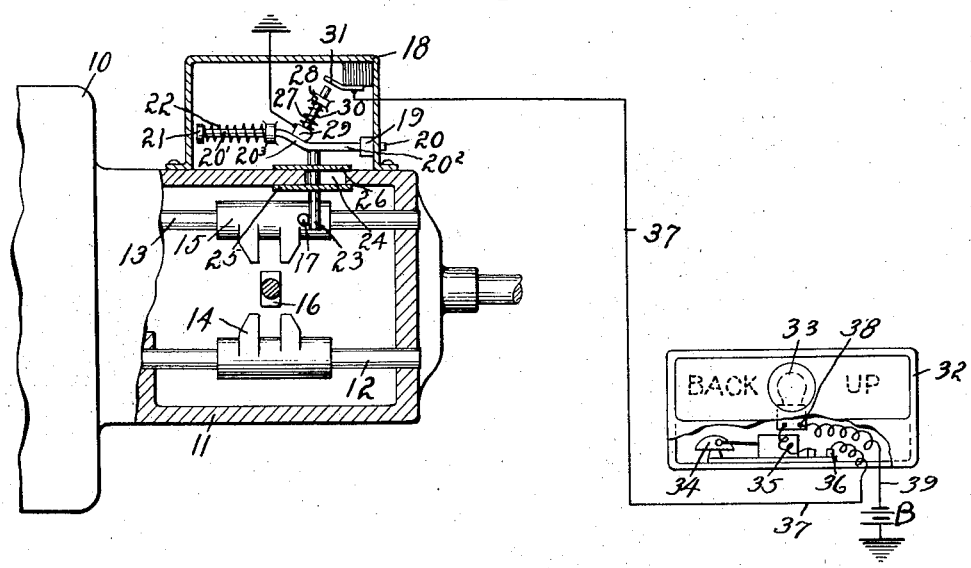
INVENTOR.
Max Wald
BY Max D. Ordmann
    ATTORNEY Patented Aug. 8, 1933

1,921,273

UNITED STATES PATENT OFFICE 1,921,273

SIGNALING DEVICE

Max Wald, New York, N. Y.

Application January 20, 1931. Serial No. 509,901

2 Claims. (Cl. 200—59)

The present invention relates to a signal device for motor vehicles and has for its main object to provide a signaling device for avoiding accidents that frequently occur in traffic when a vehicle suddenly begins to move backwards.

Another object is to construct such signaling device so that it can be readily connected to existing vehicles.

Still another object is the provision of a signaling device adapted to be attached to the gear shift mechanism of the vehicle so that it will be automatically actuated when said shift mechanism is operated.

A further object is the provision of a novel article of manufacture adaptable for universal use on a variety of types of motor vehicles.

With the above and other objects in view my invention comprises the novel combination, construction and arrangement of elements to be hereinafter more fully described, shown and defined in the appended claims.

In the accompanying drawing which forms part of this specification and in which similar reference characters denote corresponding parts:

The figure is a sectional plan view of my device applied to the gear shift mechanism of a motor vehicle.

Referring to the drawing, 10 denotes the casing which contains the usual transmission gears (not shown) and 11 the compartment in which the control rods 12 and 13 for the said gears are slidably mounted. 14 and 15 denote forked engaging members respectively on rods 12 and 13 adapted to be engaged by the shift rod 16 in well known manner to cause shifting of the gears. In the example shown the vehicle is shifted into reverse if the rod 13 is moved towards the right. Fixed to said member 15 is a pin 17 or other suitable projection.

A casing 18 is fixed to or integral with casing 11 and is shown in the present embodiment as open on the side abutting said casing 11. Slidably journalled in supports 19 in said casing 18 is a rod 20 which has two parallel straight portions 20' and $20^2$ joined by an oblique or cam portion $20^3$. Between a head 21 on said rod 20 and one of said supports 19 is mounted a coil spring 22 which tends to continuously urge said rod toward the left or normal position. The head 21 striking the casing 18 limits the movement of said rod in said direction. Extending laterally from the rod 20, preferably from the portion $20^2$ thereof is a rod member 23 which is so admeasured in length as to project through a slot 24 formed in casing 11 and into the path of pin 17 whereby when the latter is moved it will engage said member 23 and cause longitudinal shifting of said rod in opposition to the action of spring 22. Two plates 25 and 26 may be mounted on the rod member 23 one on each side of the wall casing 11 to cover the slot 24 and prevent splashing out of oil present in the casing 11. Said plates, of course, are slidable relative to said casing 11 with said member 23.

In the casing 18 I, provide a plunger member 27 which is slidably borne in a support 28 and in the present instance extends in a direction at right angles to the oblique section $20^3$ of rod 20. The end of said member 27 nearest the said section $20^3$ is formed with a head 29. A spring 30 mounted on said plunger member between said head on support 28 serves to continuously urge said head against said rod 20. The plunger member is so positioned that when rod 20 is in normal position said head 29 rests on said oblique section $20^3$ thereof. Insulatively mounted in said casing 18 in the path of the free end of plunger member 27 is an electrical contact arm 31 normally not in engagement with said plunger member.

If the rod 20 is shifted to the right, the head 29 and consequently plunger 27 is pushed forwardly against the action of spring 30 and the free end of said plunger member engages contact member 31.

All parts in casing 18 except the insulation mounting of contact member 31 may be of metal or other electrical conducting medium so that plunger 27 is grounded to the metal part of the machine.

Associated with the switching mechanism above described may be a signal of any known type and which may for example comprise an enclosed box 32 in which is mounted an electric light 33 and an oral signal such as a bell 34 or the like. On one face of said box there is provided a transparent portion in form of the words "Back up" or equivalent expression which are visible when said light 33 is lit. Said electric light and bell may be connected in series as shown by a wire 35 and one of the terminals 36 connected to contact 31 by a wire 37. The other terminal 38 may be connected by a wire 39 to one pole of battery B and the other pole of said battery may be grounded. If the plunger member 27 is made to engage with contact 31 the electric circuit through said bell and light is closed.

Of course, if desired either the light or the bell may be omitted or other type of signal substituted. Likewise the bell and light may be connected in parallel if desired.

My device may be modified in many other ways and I do not wish to be limited to the details shown and described.

What I claim is:

1. An electrical switch for use with the gear shift mechanism of a motor vehicle to close an electric circuit comprising a casing, a rod slidably journalled in said casing and having two parallel straight portions joined by an oblique portion, spring means continuously urging said rod in one direction, means to limit the movement of said rod in said direction, a plunger member slidably borne in said casing and extending at right angles to the oblique section of said rod, spring means urging one end of said plunger against said rod, said plunger member being so positioned that when said rod is in normal position said end of said plunger rests on said oblique portion, a stationary contact member insulatively mounted in said casing in the path of the other end of said plunger and so positioned as to normally be free of said plunger member, and means projecting from said rod for engagement with said gear shift mechanism to shift said rod longitudinally in opposite direction to the action of its spring to displace said plunger member and cause it to engage said stationary contact member.

2. An electrical switch for use with the gear shift mechanism of a motor vehicle to close an electric circuit comprising a stationary contact insulatively mounted thereon, a spring actuated movable contact member mounted in said casing, a longitudinally slidable rod having an oblique portion, said movable contact member movable in a direction at right angles to said oblique portion and normally engaging the latter being then out of engagement with said stationary contact member and means on said rod for engagement with said gear shift mechanism, whereby when the latter is moved said rod will be shifted causing displacement of said movable contact member, into engagement with said stationary contact member.

MAX WALD.